(12) United States Patent
Tanaka et al.

(10) Patent No.: US 9,960,001 B2
(45) Date of Patent: May 1, 2018

(54) RELAY SYSTEM

(71) Applicants: NIPPON SOKEN, INC., Nishio, Aichi-pref. (JP); DENSO CORPORATION, Kariya, Aichi-pref. (JP); ANDEN CO., LTD., Anjo, Aichi-pref. (JP)

(72) Inventors: Ken Tanaka, Nishio (JP); Shota Iguchi, Kariya (JP); Tomoaki Tanaka, Okazaki (JP)

(73) Assignees: NIPPON SOKEN, INC., Nishio (JP); DENSO CORPORATION, Kariya (JP); ANDEN CO., LTD., Anjo (JP)

( * ) Notice: Subject to any disclaimer, the term of this patent is extended or adjusted under 35 U.S.C. 154(b) by 255 days.

(21) Appl. No.: 15/045,805

(22) Filed: Feb. 17, 2016

(65) Prior Publication Data

US 2016/0247650 A1     Aug. 25, 2016

(30) Foreign Application Priority Data

Feb. 19, 2015   (JP) ................. 2015-030830

(51) Int. Cl.
| | |
|---|---|
| H01H 9/30 | (2006.01) |
| H01H 47/32 | (2006.01) |
| H02H 9/00 | (2006.01) |
| H01H 9/54 | (2006.01) |
| H01H 47/00 | (2006.01) |
| H01H 50/54 | (2006.01) |
| H01H 51/20 | (2006.01) |

(52) U.S. Cl.
CPC .......... *H01H 47/325* (2013.01); *H02H 9/001* (2013.01); *H01H 9/541* (2013.01); *H01H 9/542* (2013.01); *H01H 47/002* (2013.01); *H01H 50/546* (2013.01); *H01H 51/20* (2013.01)

(58) Field of Classification Search
USPC ....................................... 361/2–13
See application file for complete search history.

(56) References Cited

U.S. PATENT DOCUMENTS

| | | | |
|---|---|---|---|
| 2004/0027734 A1* | 2/2004 | Fairfax | H01H 9/542 361/2 |
| 2015/0124412 A1* | 5/2015 | Keegan | H02M 7/5387 361/734 |
| 2016/0089998 A1* | 3/2016 | Thommes | H02H 11/005 701/22 |

FOREIGN PATENT DOCUMENTS

| | | |
|---|---|---|
| JP | 2012-152071 A | 8/2012 |
| JP | 2015-035708 A | 2/2015 |

* cited by examiner

*Primary Examiner* — Danny Nguyen
(74) *Attorney, Agent, or Firm* — Oliff PLC

(57) ABSTRACT

A relay system is provided which is designed to avoid flow of inrush current through a capacitor in a pre-charge mode wherein the capacitor is pre-charged. The relay system includes a pair of power lines, a capacitor, a series-connected assembly, a control circuit, and a relay module. The relay module includes two main switches, a main coil, and a sub-coil. In the pre-charge mode, the control circuit energizes both the main and sub-coils to turn on only one of the main switches. Before entering the pre-charge mode, the control circuit diagnoses the sub-coil. When the sub-coil is determined as being malfunctioning, the control circuit inhibits the pre-charge mode from being entered.

4 Claims, 17 Drawing Sheets

RELAY SYSTEM

CROSS REFERENCE TO RELATED DOCUMENT

The present application claims the benefit of priority of Japanese Patent Application No. 2015-30830 filed on Feb. 19, 2015, the disclosure of which is incorporated herein by reference.

BACKGROUND

1 Technical Field

This disclosure relates generally to a relay system equipped with a pair of main switches and a control circuit working to control on-off operations of the main switches.

2 Background Art

Japanese Patent First Publication No, 2012-152071 discloses a relay system equipped with a pair of power lines, main switches, a capacitor, and a control circuit. The power lines connect between a do power supply and an electrical device. The main switches are disposed in the power lines, respectively. The capacitor is connected between the power lines. The control circuit works to control on-off operations of the main switches. The relay system also has a series-connected assembly of a current-limiting resistor and a pre-charge switch. The series-connected assembly is connected in parallel to one of the main switches. The control circuit works to control on-off operations of the main switches and the pre-charge switch.

The main switches are disposed in a relay module along with a main coil and a sub-coil. The relay module is engineered to turn on both the main switches when only the main coil is energized and turn on only one of the main switches to which the series-connected assembly is not joined when the main and sub-coils are both energized.

The control circuit turns on or off the main switches and the pre-charge switch to switch among a power-off mode, a pre-charge mode, and a power-on mode. In the power-off mode, the control circuit turns off the main switches to stop supply of electric power from the dc power supply to the electrical device. In the pre-charge mode, the control circuit turns on the pre-charge switch and energizes the main and sub-coils to turn on one of the main switches to which the series-connected assembly is joined in parallel, while turning off the other main switches to which the series-connected assembly is not joined, thereby causing electric current to flow to the capacitor through the current-limiting resistor to charge the capacitor gradually. After the capacitor is charged, the control circuit enters the power-on mode in which only the main coil is energized to turn on both the main switches, thereby starting delivering the power from the do power supply to the electrical device.

As described above, the relay system turns on both the main switches after the capacitor is charged. This eliminates the risk that the main switches are both turned on when the capacitor is not yet charged, thus resulting in flow of inrush current to the capacitor.

The relay system is, as described above, designed to energize both the main and sub-coils in the pre-charge mode and alternatively energize only the main coil in the power-on mode. The supply of power to the electrical device is, therefore, maintained only by energizing the main coil, thereby reducing the amount of power consumed by the coils in the power-on mode.

The relay system, however, encounters the drawback in that when the sub-coil has malfunctioned, it may cause the main switches to be both turned on in the pre-charge mode, so that the inrush current flows to the capacitor. Specifically, in the pre-charge mode, the main and sub-coils are usually energized. If, therefore, the sub-coil has failed, only the main coil will be energized, so that the power-on mode, not the pre-charge mode will be entered. Therefore, the capacitor is not charged fully, but the main switches are both turned on, which may cause the inrush current to flow to the capacitor.

SUMMARY OF THE INVENTION

It is therefore an object of the invention to provide a relay system which is designed to eliminate the risk that inrush current flows through a capacitor in a pre-charge mode where the capacitor is desired to be pre-charged.

According to one aspect of the invention, there is a relay system which comprises: (a) a pair of power lines which connect between a do power supply and an electrical device; (b) main switches disposed in said power lines, respectively; (c) a capacitor connected between said power lines; (d) a series-connected assembly which includes a current-limiting resistor and a pre-charge switch joined in series with the current-limiting resistor, the series-connected assembly being connected in parallel to one of the main switches; and (c) a control circuit which works to control on-off operations of the main switches and the pre-charge switch.

The main switches are disposed in a relay module along with a main coil and a sub-coil. The relay module is designed to turn on both the main switches when only the main coil is energized and also to turn on only one of the main switches to which the series-connected assembly is not joined in parallel when both the main and sub-coils are energized.

The control circuit switches among a power-off mode, a pre-charge mode, and a power-on mode. When the power-off mode is entered, the main switches are both turned off to supply no power to the electrical device. When the pre-charge mode is entered, the pre-charge switch is turned on. The main and sub-coils are also energized to turn off one of the main switches to which the series-connected assembly is joined in parallel and turn on the other main switch to which the series-connected assembly is not joined. When the power-on mode is entered following the pro-charge mode, only the main coil is energized to turn on both the main switches to supply the power to the electrical device.

When the relay system starts or terminates, the control circuit works to diagnose operations of the sub-coil. When it is determined that the sub-coil is malfunctioning, the control circuit inhibits the pre-charge mode from being entered. This avoids switching to the pre-charge mode when the sub-coil is malfunctioning, thus eliminating the risk that only the main coil is energized in the pre-charge mode to turn on both the main switches when the capacitor is not charged completely. This avoids the flow of inrush current through the capacitor.

In the following discussion, the fact that the coil is malfunctioning means that the coil is broken, disconnected fully, or nearly disconnected, thus resulting in an increase in resistance thereof.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
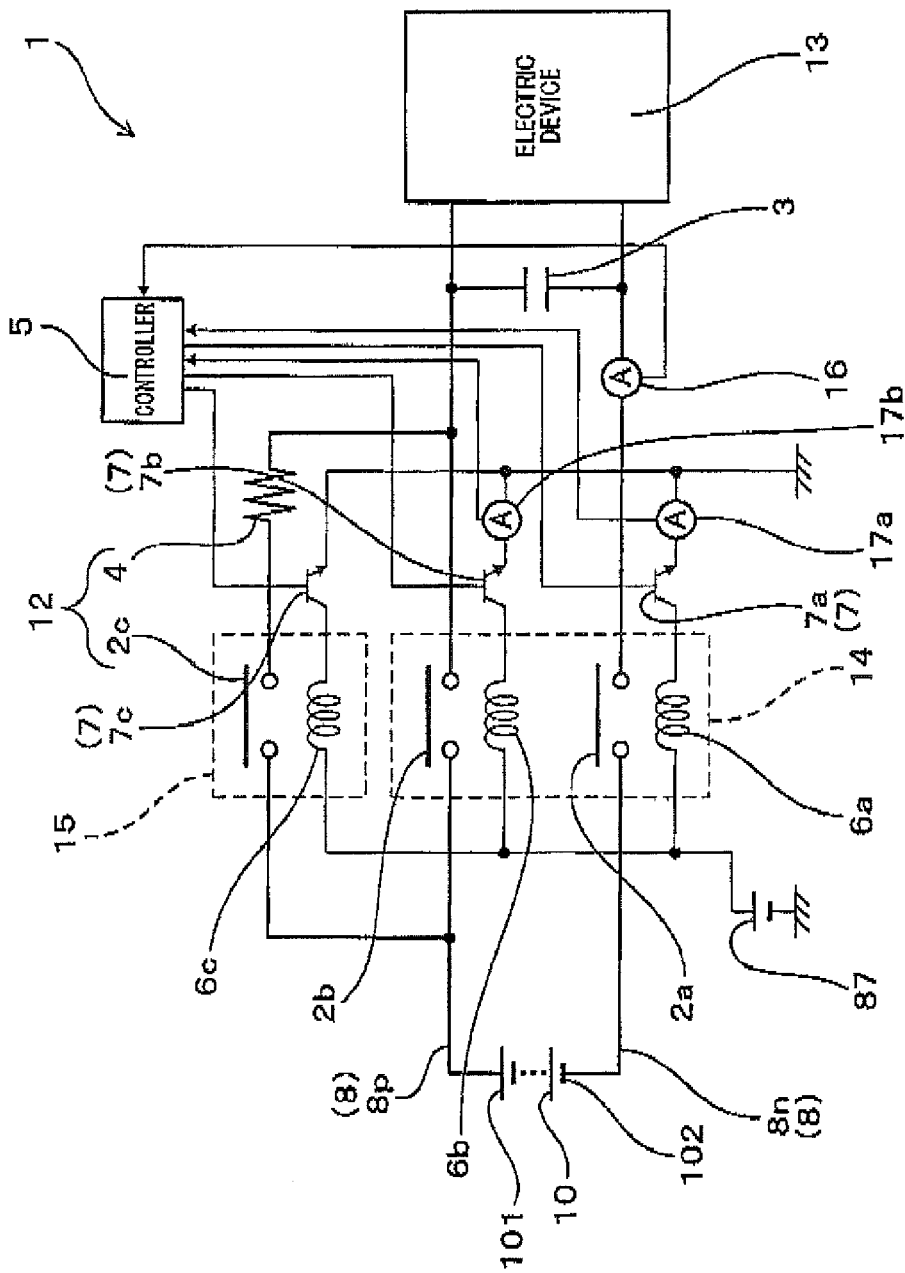
FIG. 1 is a circuit diagram which illustrates a relay system in a power-off mode according to the first embodiment.

A relay system according to embodiments will be described below which may be used for electrical devices such as inverters or DC-DC converters to drive vehicles such as electric vehicles or hybrid vehicles.

First Embodiment

FIGS. 1 to 9 illustrates a relay system 1 in the first embodiment. The relay system 1, as clearly illustrated in FIG. 1, includes power lines 8, a first and a second main switch 2a and 2b, a capacitor 3, a series-connected assembly 12, and a control circuit 5. The power lines 8 includes a first and a second power line 8p and 8n. The power lines 8p and 8n connect a dc power supply 10 and an electrical device 13. Each of the main switches 2a and 2b is disposed in one of the power lines 8p and 8n.

The capacitor 3 is connected between the power lines 8p and 8n. The series-connected assembly 12 is made up of a current-limiting resistor 4 and a pre-charge switch 2c connected in series with the current-limiting resistor 4. The series-connected assembly 12 is connected in parallel to one of the main switches 2a and 2b (i.e., the second main switch 2b in this embodiment). The control circuit 5 works to control on-off operations of the main switches 2a and 2b and the pre-charge switch 2c.

The main switches 2a and 2b are installed in a relay module 14 along with a main coil 6a and a sub-coil 6b. The relay module 14 is engineered to turn on both the main switches 2a and 2b when only the main coil 6a is electrically energized and alternatively turn on only the main switch 2a to which the series-connected assembly 21 is not connected in parallel when both the coils 6a and 6b are electrically energized.

Figure 2:
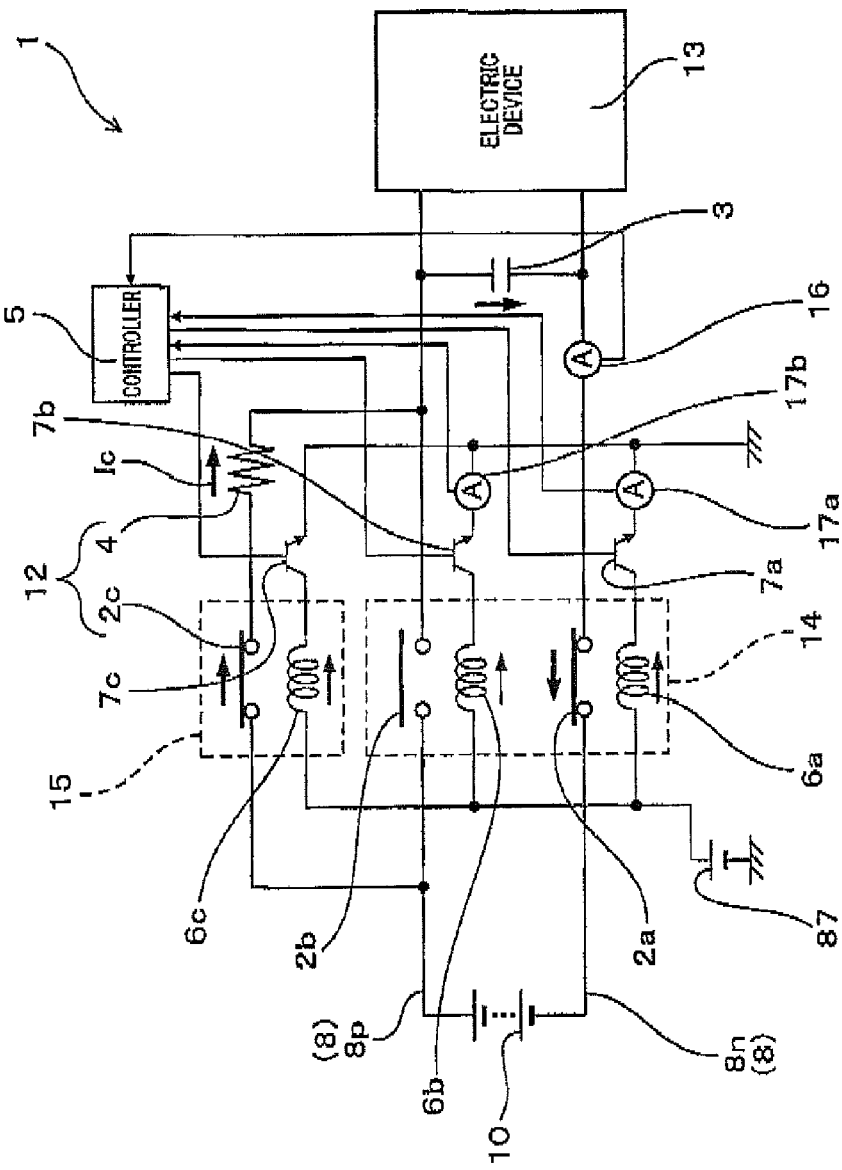
FIG. 2 is a circuit diagram which illustrates a relay system in a pre-charge mode according to the first embodiment.
Figure 3:
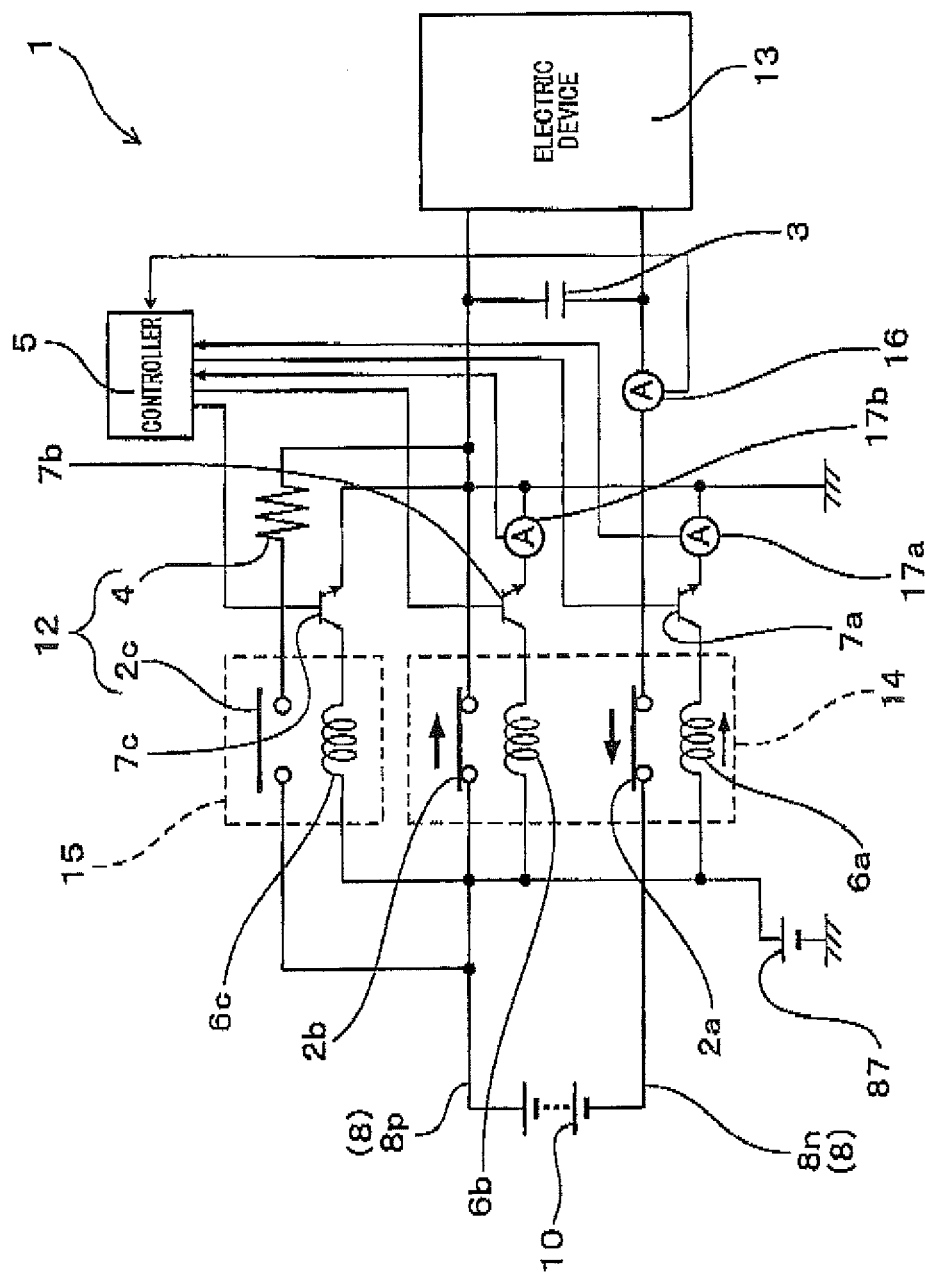
FIG. 3 is a circuit diagram which illustrates a relay system in a power-on mode according to the first embodiment.

The control circuit 5 is designed to switch among three operation modes: a power-off mode (see FIG. 1), a pre-charge mode (see FIG. 2), and a power-on mode (see FIG. 3). In the power-off mode, the control circuit 5 works to stop energizing the coils 6a and 6b to turn off the main switches 2a and 2b, thereby stopping supply electric power from the dc power supply 10 to the electrical device 13.

In the pre-charge mode, as illustrated in FIG. 2, the control circuit 5 works to turn on the pre-charge switch 2c and also energize both the coils 6a and 6b, thereby turning off the main switch 2b to which the series-connected assembly 12 is connected in parallel and turning on the main switch 2a to which the series-connected assembly 12 is not connected in parallel. This causes the current to flow through the current-limiting resistor 4 to charge the capacitor 3 gradually.

The control circuit 5 enters the power-on mode following the pre-charge mode. Specifically, when entering the power-on mode, the control circuit 5, as clearly illustrated in FIG. 3, works to energize only the main coil 6a to turn on both the main switches 2a and 2b, thereby supplying the power from the do power supply 10 to the electrical device 13.

The control circuit 5 also works to diagnose whether the sub-coil 6b is malfunctioning or not at start of the relay system 1, that is, when the power-off mode is switched to the pre-charge mode. When it is determined that the sub-coil 6b has failed in operation thereof, the control circuit 5 inhibits the power-off mode from being switched to the pre-charge mode.

The relay system 1, as referred to in this embodiment, is designed to be mounted in a vehicle such as an electric vehicle or a hybrid vehicle. The electrical device 13, as referred to in this embodiment, is an inverter or a DC-DC converter.

The power lines 8, as described above, includes the power line 8p which connects, as illustrated in FIG. 1, between a positive electrode 101 of the do power supply 10 and the electrical device 13 and the power line 8n which connects between a negative electrode 102 of the do power supply 10 and the electrical device 13. The series-connected assembly 12 of this embodiment is connected in parallel to the main switch 2b installed in the positive power line 8p.

The pre-charge switch 2c is installed in a pre-charge relay 15 along with a pre-charge coil 6c. The pre-charge relay 15 is designed to turn on the pre-charge switch 2c when the pre-charge coil 6c is energized.

Transistors 7 (7a to 7c) are connected to the main coil 6a, the sub-coil 6b, and the pre-charge coil 6c, respectively. The transistors 7 connect at a base thereof to the control circuit 5. The control circuit 5 works to turn on or off the transistors 7 to energize or deenergize the coils 6 (i.e., the coils 6a to 6c).

The transistors 7a and 7b are also connected to diagnostic current sensors 17a and 17b. The diagnostic current sensors 17a and 17b connect with the control circuit 5. The control circuit 5 places the transistor 7b in an off-state for a short period of time when diagnosing the operation of the sub-coil 6b. When the diagnostic current sensor 17b measures a current value higher than or equal to a given value, the control circuit 5 determines that the sub-coil 6b is operating properly. Alternatively, when the diagnostic current sensor 17b measures a current value lower than the given value, the control circuit 5 determines that the sub-coil 6b is malfunctioning, that is, that the sub-coil 6b is fully broken or nearly disconnected, thus resulting in an increase in resistance thereof.

The diagnosis of the operation of the sub-coil 6b may alternatively be made in another way without use of the diagnostic current sensor 17b. For instance, such diagnosis may be made by measuring a level of voltage appearing across terminals of the sub-coil 6b using a voltage sensor (not shown) connected to the sub-coil 6b.

After diagnosing the sub-coil 6b, the control circuit 5 also diagnoses whether the main coil 6a is malfunctioning or not. Specifically, the control circuit 5 places the transistor 7a in an off-state for a short period of time. When the diagnostic current sensor 17a measures a current value higher than or equal to a given value, the control circuit 5 determines that the main coil 6a is operating properly. Alternatively, when the diagnostic current sensor 17a measures a current value lower than the given value, the control circuit 5 determines that the main coil 6a is malfunctioning. The diagnosis of the main coil 6a is, as described above, made by turning on the transistor 7a for a short period of time, thereby preventing the switches 2a and 2b from being turned on.

A charge-diagnostic current sensor 16 is connected to the negative power line 8n. The charge-diagnostic current sensor 16 is also connected to the control circuit 5. When the capacitor 3 is charged in the pre-charge mode, the current will flow through the negative power line 8n. The charge-diagnostic current sensor 16 measures such current. When the capacitor 3 is charged completely, it will cause current to stop flowing through the negative power line 8n. Therefore, when detecting the fact that the charge-diagnostic current sensor 16 measures no current, the control circuit 5 determines that the capacitor 3 has finished being charged and then enters the power-on mode.

The operation of the control circuit 5 will also be described below with reference to FIG. 4. The control circuit 5 works to switch the operation thereof among the power-off mode, the pre-charge mode, and the power-on mode. In the power-off mode, the coils 6a, 6b, and 6e are all not energized, so that the switches 2a, 2b, and 2c are all in the off-state. When the relay system 1 starts, and it is required to switch the power-off mode to the pre-charge mode at time t1, the control circuit 5 turns on the transistor 7b, as illustrated in FIG. 1, for a short period of time. When the diagnostic current sensor 17b does not measure the current value as being higher than or equal to the given value, the control circuit 5 determines the sub-coil 6b as being malfunctioning and then stops performing subsequent operations.

The relay module 14 is, as will be described later in detail, designed to turn on both the main switches 2a and 2b when only the sub-coil 6b is energized for a long period of time. For this reason, when it is required to diagnose the sub-coil 6b, the control circuit 5 turns on the transistor 7b for a short period of time to decrease a length of time the current flows through the sub-coil 6b in order not to turn on the main switches 2a and 2b simultaneously.

When it is determined that the sub-coil 6b is operating properly, the control circuit 5 turns on, as illustrated in FIG. 1, the transistor 7a for a short period of time at time t2. When the diagnostic current sensor 17a does not detect the current value higher than the given value, the control circuit 5 concludes that the main coil 6a is malfunctioning and stops performing subsequent operations.

When it is determined that the sub-coil 6b and the main coil 6a are both operating properly, the control circuit 5 enters the pre-charge mode. Specifically, at time t3, the control circuit 5 energizes the pre-charge coil 6c to turn on the pre-charge switch 2c. Subsequently, at time t4, the control circuit 5 energizes the main coil 6a and the sub-coil 6b, thereby turning off the main switch 2b to which the series-connected assembly 12 is connected in parallel and turning on the main switch 2a to which the series-connected assembly 12 does not connect in parallel. This causes the current to be delivered from the dc power supply 10 to the capacitor 3 through the current-limiting resistor 4, so that the capacitor 3 starts being charged, as illustrated in FIG. 2.

After the capacitor 3 is charged completely, at time t5, the control circuit 5 turns off the sub-coil 6b, thereby placing both the main switches 2a and 2b in the on-state, so that the power-on mode is entered. After turning off the sub-coil 6b, at time t6, the control circuit 5 turns off the pre-charge coil 6c, thereby turning off the pre-charge switch 2c and supplies the power from the dc power supply 10 to the electrical device 13.

When receiving a power-off request signal to stop supplying the power to the electrical device 13 at time t7, the control circuit 5 turns off the main coil 6a, thereby turning on both the main switches 2a and 2b, so that the power-off mode is entered. The dc power supply 10 then stops supplying the power to the electrical device 13.

Figure 5:
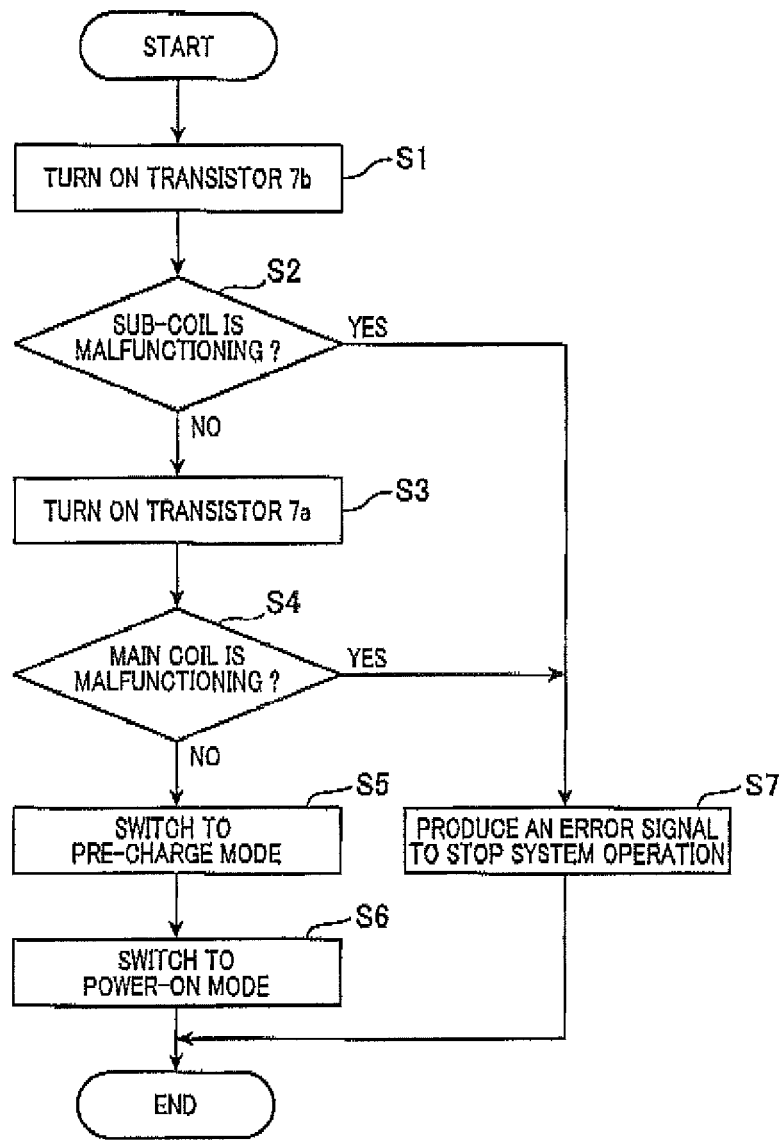
FIG. 5 is a flowchart of a program to be executed by a relay system in the first embodiment.

FIG. 5 is a flowchart of a sequence of logical steps or program to be executed by the control circuit 5.

After entering the program, the routine proceeds to step S1 wherein the transistor 7b is, as illustrated in FIG. 1, turned on. The routine then proceeds to step S2 wherein it is determined whether the sub-coil 6b is malfunctioning or not. If a YES answer is obtained meaning that the transistor 7b is turned on, but the current value higher than or equal to the given value is not detected by the diagnostic current sensor 17b (see FIG. 1), the control circuit 5 determines that the sub-coil 6b is malfunctioning. Alternatively, if a NO answer is obtained meaning that the current value higher than or equal to the given value is detected by the diagnostic current sensor 17b, the control circuit 5 determines that the sub-coil 6b is operating properly.

Specifically, if a YES answer is obtained in step S2 meaning that the sub-coil 6b has failed in operation thereof, the routine then proceeds to step S7 wherein an error signal is produced to inhibit the pre-charge mode from being entered.

Alternatively, if a NO answer is obtained in step S2 meaning that the sub-coil 6b is not malfunctioning, the routine then proceeds to step S3 wherein the transistor 7a is turned on. The routine proceeds to step S4, wherein it is determined whether the main coil 6a is malfunctioning or not. If a YES answer is obtained meaning that the transistor 7a is turned on, but the current value higher than or equal to the given value is not detected by the diagnostic current sensor 17a (see FIG. 1), the control circuit 5 determines that the main coil 6a is malfunctioning. Alternatively, if a NO answer is obtained meaning that the current value higher than or equal to the given value is detected by the diagnostic current sensor 17a, the control circuit 5 determines that the main coil 6a is operating properly.

Specifically, if a YES answer is obtained in step S4 meaning that the main coil 6a has failed in operation thereof, the routine then proceeds to step S7 wherein the error signal is produced to inhibit the following operations from being executed, that is, the pre-charge mode from being entered. Alternatively, if a NO answer is obtained in step 94 meaning that the main coil 6a is not malfunctioning, the routine then proceeds to step S5 wherein the pre-charge mode is entered. The routine then proceeds to step S6 wherein the power-on mode is entered.

Figure 7:
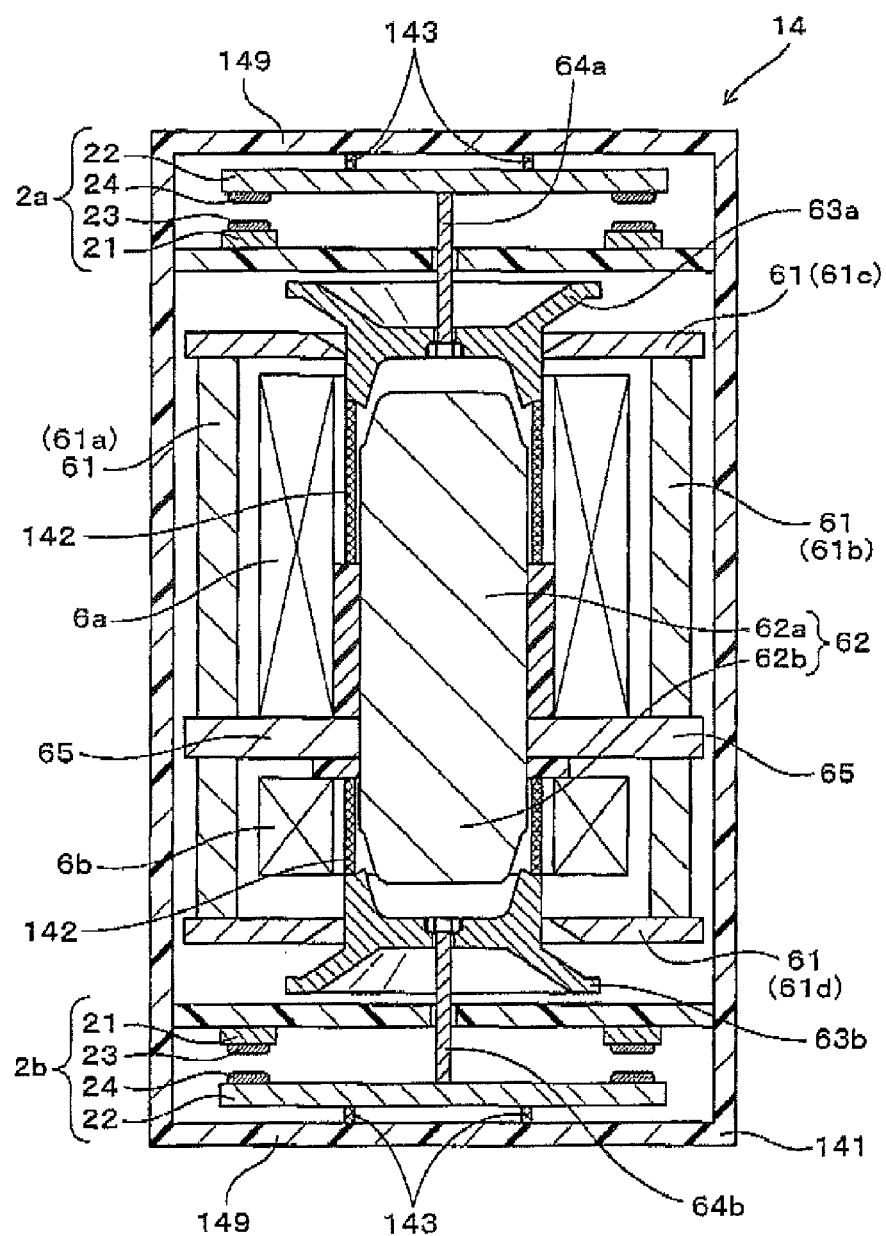
FIG. 7 is a longitudinal sectional view which illustrates a relay module installed in a relay system in which two main switches are turned off in the first embodiment.

The structure of the relay module 14 will be described below. The relay module 14, as illustrated in FIG. 7, includes the main coil 6a, the sub-coil 6b, yokes 61 (61a to 61d), a first plunger 63a, a second plunger 63b, a first fixed core 62a, a second fixed core 62b, and the main switches 2a and 2b. The first fixed core 62a is arranged inside the main coil 6a. The second fixed core 62b is arranged inside the sub-coil 6b. The first plunger 63a is magnetically attracted by the first fixed core 62a. Similarly, the second plunger 63b is magnetically attracted by the second fixed core 62b. The first fixed core 62a and the second fixed core 62b are made in the shape of a single unit, that is, implemented by a single fixed core 62.

Figure 6:
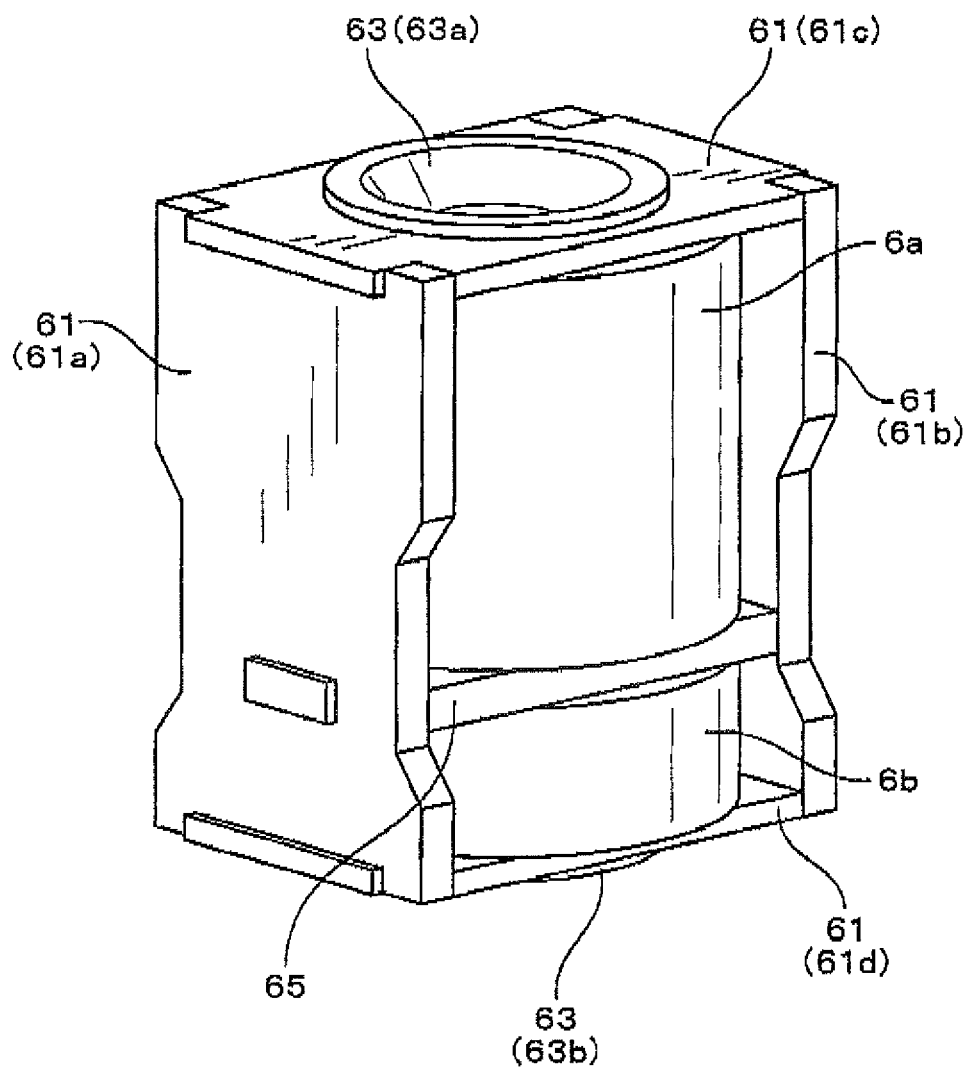
FIG. 6 is a partial perspective view which illustrates a relay module installed in a relay system in the first embodiment.

The yokes 61, as can be seen in FIG. 6, includes a first side wall yoke 61a, a second side wall yoke 61b, a first connecting yoke 61c, and a second connecting yoke 61d. The connecting yokes 61c and 61d mechanically connect the side wall yokes 61a and 61b together. A magnetic saturator 65 is interposed between the electromagnetic coils 6a and 6b. The magnetic saturator 65 works to saturate therein magnetic flux Φ produced by the main coil 6a. The magnetic saturator 65 connects with the side wall yokes 61a and 61b.

The fixed core 62 is disposed inside the magnetic coils 6a and 6b. The plungers 63a and 63b have spring members 142 mounted thereon (which will also be referred to as plunger springs below). The plunger springs 142 press or urge the plungers 63a and 63b away from the fixed core 62. The plungers 63a and 63b have poles or shafts 64a and 64b mounted thereon.

Each of the switches 2a and 2b is made up of a fixed contact support 21, a moving contact support 22, a fixed contact 23, and a moving contact 24. The fixed contact 23 is retained by the fixed contact support 21. The moving contact 24 is retained by the moving contact support 22. The relay module 14 also includes a relay case 141 with side walls 149. Spring members 143 (which will also be referred to as switch springs below) are disposed between each of the side walls 149 and a corresponding one of the moving contact supports 22 to press the moving contact support 22 toward the fixed core 62.

Figure 9:
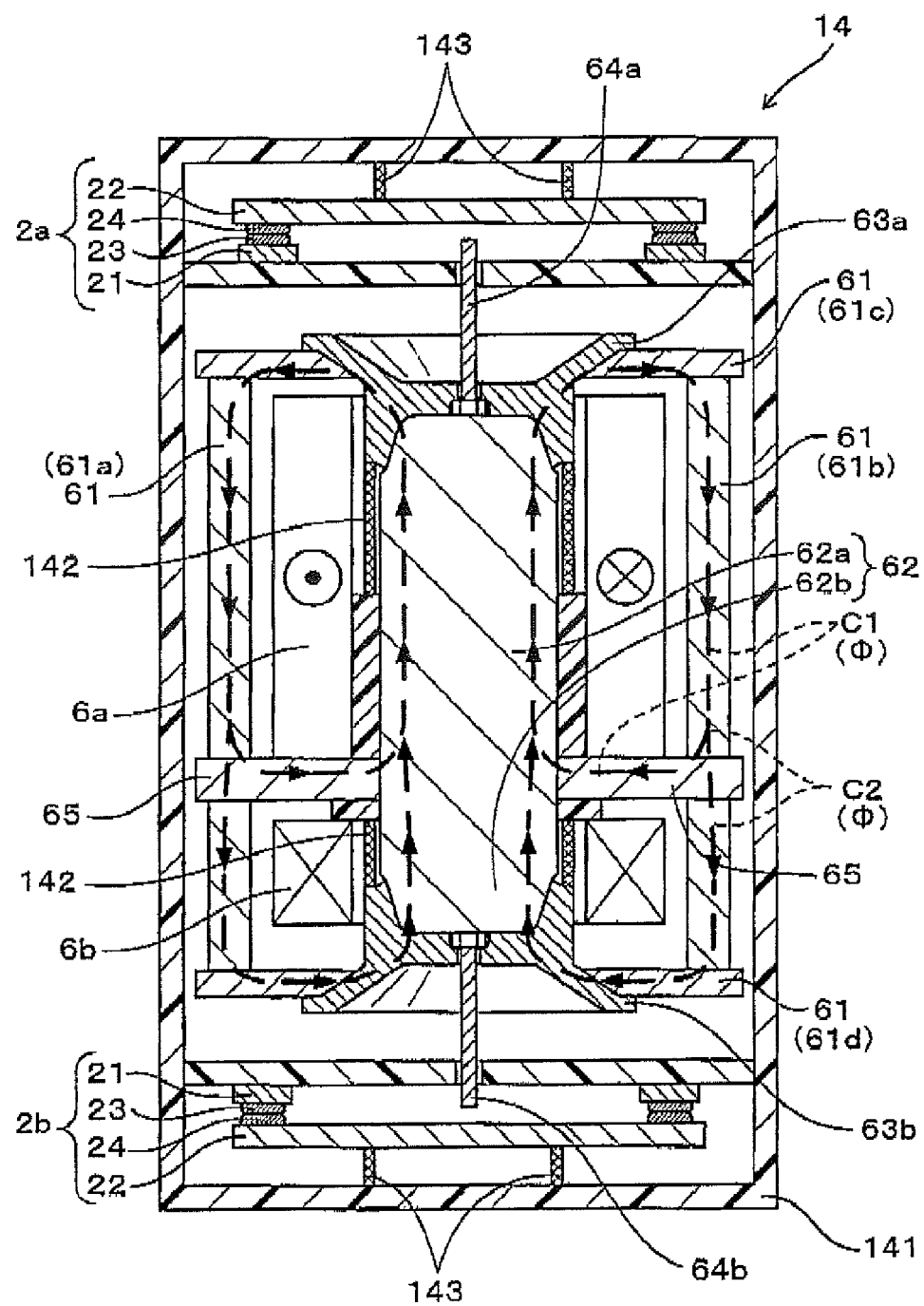
FIG. 9 is a longitudinal sectional view which illustrates a relay module installed in a relay system in which two main switches are turned on in the first embodiment.

When only one of the electromagnetic coils 6a and 6b, i.e., the main coil 6a in this embodiment is energized, as illustrated in FIG. 9, it will cause the magnetic flux Φ to be produced by the main coil 6a. The magnetic flux Φ creates two flux flows: one traveling through a first magnetic circuit C1, and the other traveling through a second magnetic circuit C2. The first magnetic circuit C1 is made up of the first fixed core 62a, the first plunger 63a, the yokes 61 (61a, 61b, and 61c), and the magnetic saturator 65. The second magnetic circuit C2 is made up of the first fixed core 62a, the second fixed core 62b, the first plunger 63a, the yokes 61 (61a to 61d), and the second plunger 63b. Specifically, the magnetic flux Φ, as produced by the main coil 6a, is restricted by the magnetic saturator 65, so that the magnetic flux Φ flows through the second magnetic circuit C2 as well as the first magnetic circuit C1. The energisation of only the main coil 6a will, therefore, cause the plungers 63a and 63b to be both attracted by the fixed core 62.

When the plungers 63a and 63b are moved toward the fixed core 62, the moving contact support 22 is pressed by the switch springs 143 to bring the moving contacts 24 into contact with the fixed contacts 23, thereby turning on the main switches 2a and 2b, respectively.

Figure 8:
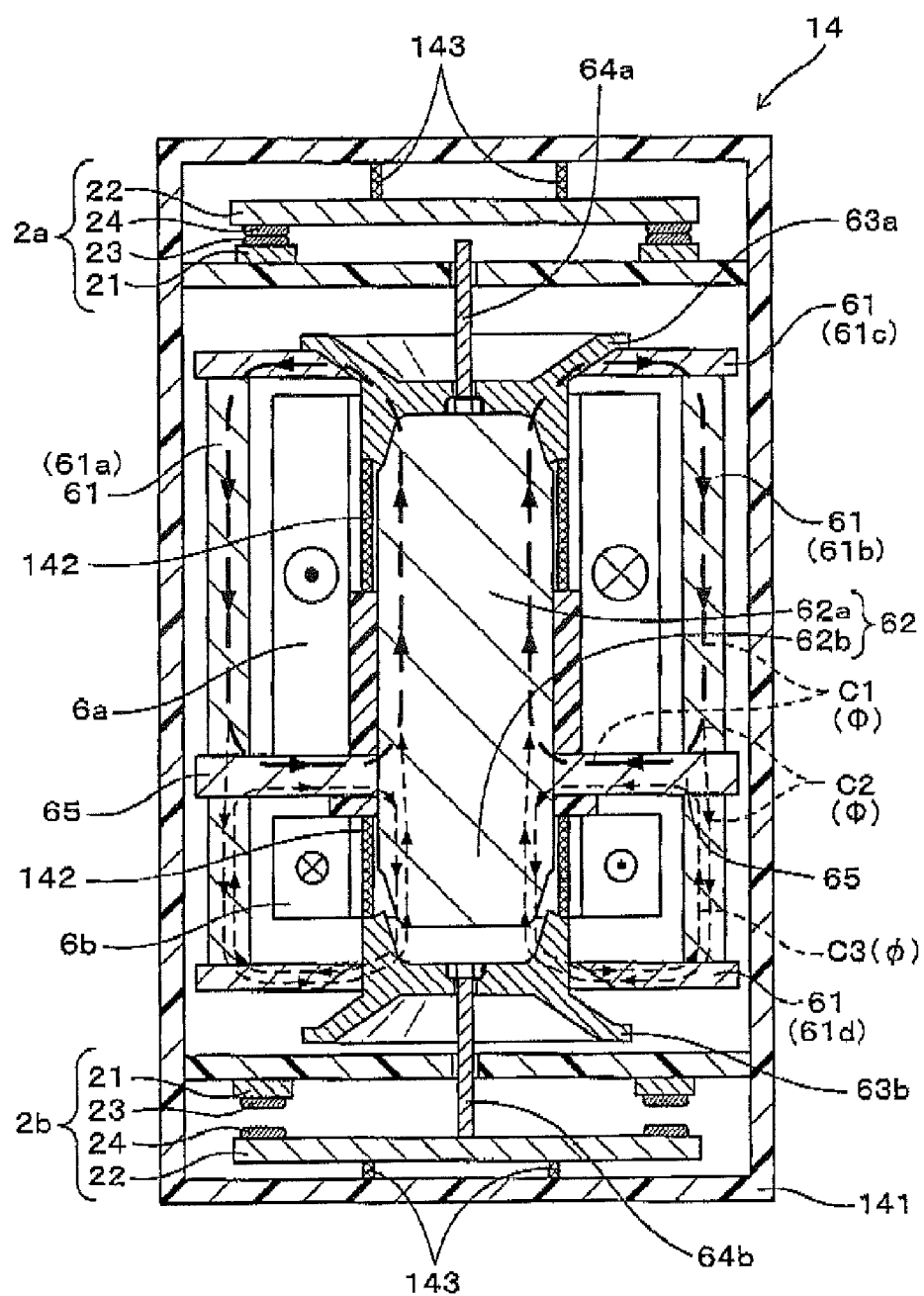
FIG. 8 is a longitudinal sectional view which illustrates a relay module installed in a relay system in which only one of two main switches is turned on in the first embodiment.

When both the main coil 6a and the sub-coil 6b are, as illustrated in FIG. 8, energized, it will cause the magnetic flux Φ, as produced by the main coil 6a, to create two flows: one traveling through the first magnetic circuit C1, and the other traveling through the second magnetic circuit C2, and magnetic flux Φ, as produced by the sub-coil 6b, to create two flows: one traveling through the first magnetic circuit C1, and the other traveling through a third magnetic circuit C3. The third magnetic circuit C3 is made up of the second fixed core 62b, the yokes 51 (61a, 61b, and 61d), the second plunger 63b, and the magnetic saturator 65. The flow of the magnetic fluxes Φ, as produced by the sub-coil 6b and the flow of the magnetic flux Φ, as produced by the main coil 6a, are oriented in opposite directions between the second plunger 63b and the second fixed core 62b. The magnetic flux Φ produced by the main coil 6a and the magnetic flux Φ produced by the sub-coil 6b are, therefore, apparently cancelled by each other between the second plunger 63b and the second fixed core 62b, thus resulting in a decreased magnetic force to move the second plunger 63b toward the second fixed core 62b, so that the second plunger 63b is not attracted fully to the sub-coil 6b, thereby placing the main switch 2b to which the series-connected assembly 12 is, as shown in FIG. 1, connected in the off-state.

The main coil 6a is designed in this embodiment to produce a greater magnitude of magnetomotive force than that produced by the sub-coil 6b. Therefore, when both the coils 6a and 6b are energized, the greater magnetic flux Φ produced by the main coil 6a will flow through the first magnetic circuit C1, thus causing the first plunger 63a to be attracted to the first fixed core 62a to turn on the main switch 2a to which the series-connected assembly 12 is, as illustrated in FIG. 1, not connected in parallel. When the coils 6a and 6b are both deenergized, as illustrated in FIG. 7, it will cause the magnetic fluxes Φ to disappear, so that the plungers 63a and 63b are moved away from the stationary core 62, thereby turning off the main switches 2a and 2b.

When only one of the coils 6a and 6b, i.e., the sub-coil 6b is energized, it will cause the magnetic flux Φ produced by the sub-coil 6b to create two flows: one traveling through the second magnetic circuit C2, and the other traveling through the third magnetic circuit C3. The relay module 14 is designed to turn on both the main switches 2a and 2b with the aid of magnetic force, as created in the above condition.

The beneficial advantages, as offered by the relay system 1, will be described below. When the relay system 1 is started up, the control circuit 5, as already described with reference to FIGS. 4 and 5, works to diagnose the operation of the sub-coil 6b. When it is determined that the sub-coil 6b is malfunctioning, the control circuit 6 inhibits the pre-charge mode from being entered. This avoids switching to the pre-charge mode when the sub-coil 6b is not operating properly, thereby eliminating the risk that only the main coil 6a is energized in the pre-charge mode so that both the main switches 2a and 2b are turned on when the capacitor 3 is not charged completely. This avoids flow of inrush current through the capacitor 3.

Figure 4:
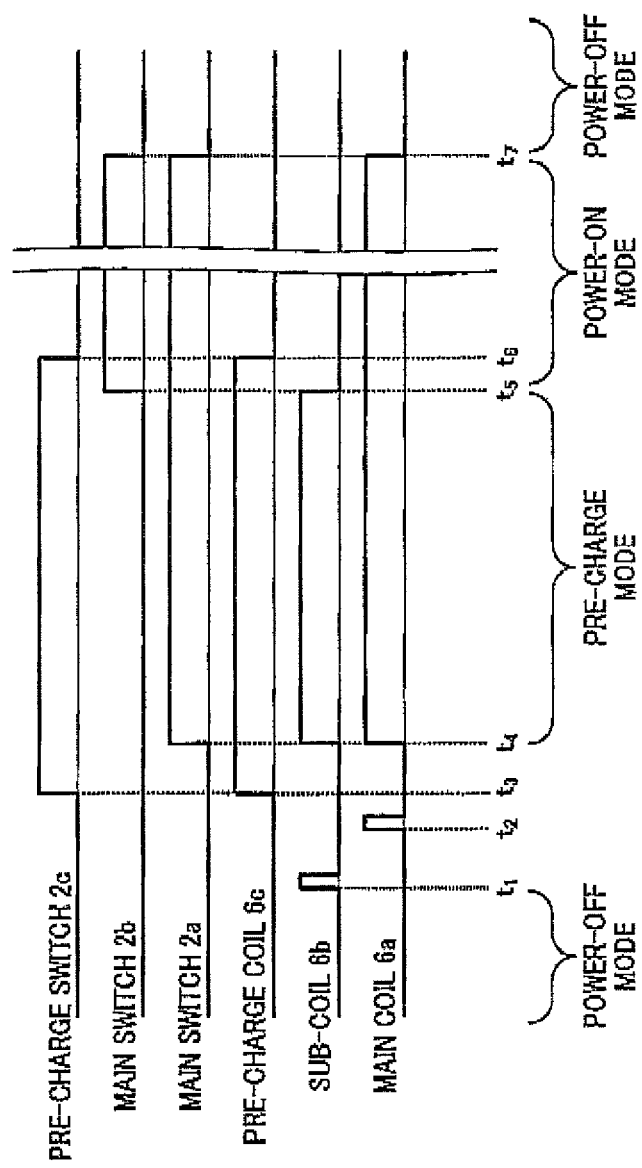
FIG. 4 is a timing chart which demonstrates operations of parts of a relay system in the first embodiment.

After the sub-coil 5b is diagnosed, as can be seen from FIGS. 4 and 5, the control circuit 5 diagnoses the operation of the main coil 61. Specifically, the relay module 14 is designed to turn on both the main switches 2a and 2b in response to energization of only the sub-coil 6b. Therefore, if the sub-coil 6b is operating properly, but the main coil 6a is malfunctioning, switching to the pre-charge mode will cause only the sub-coil 6b to be energized, so that the main switches 2a and 2b are turned on, which may lead to flow of inrush current through the capacitor 3. In order to alleviate this drawback, the control circuit 5 confirms that the main coil 6a is operating properly and enters the pre-charge mode after determining that both the main coil 6a and the sub-coil 6b are operating properly.

As apparent from the above discussion, this embodiment provides the relay system 1 which is capable of avoiding the flow of inrush current through the capacitor 3 in the precharge mode.

The series-connected assembly 12 is, as illustrated in FIG. 1, connected to the positive power line 8p, but may alternatively be joined to the negative power line 8n.

Second Embodiment

The relay system 1 of the second embodiment will be described below. The same reference numbers as employed in the first embodiment refer to the same parts unless otherwise specified, and explanation thereof in detail will be omitted here.

The relay system 1 of this embodiment is different from that in the first embodiment in structure of the relay module 14 and the operation of the control circuit 5, as shown in FIG. 5. Specifically, the relay module 14 of this embodiment is designed to turn off both the main switches 2a and 2b when only one of the coils 6a and 6b, i.e., the sub-coil 6b is energized.

Figure 10:
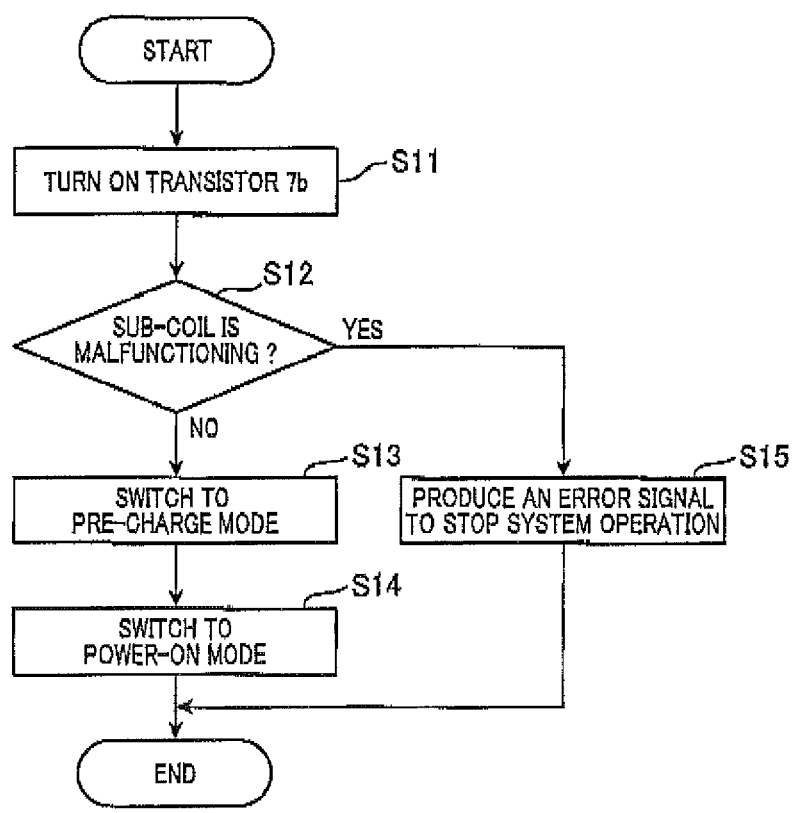
FIG. 10 is a flowchart of a program be executed by a relay system in the second embodiment.
Figure 11:
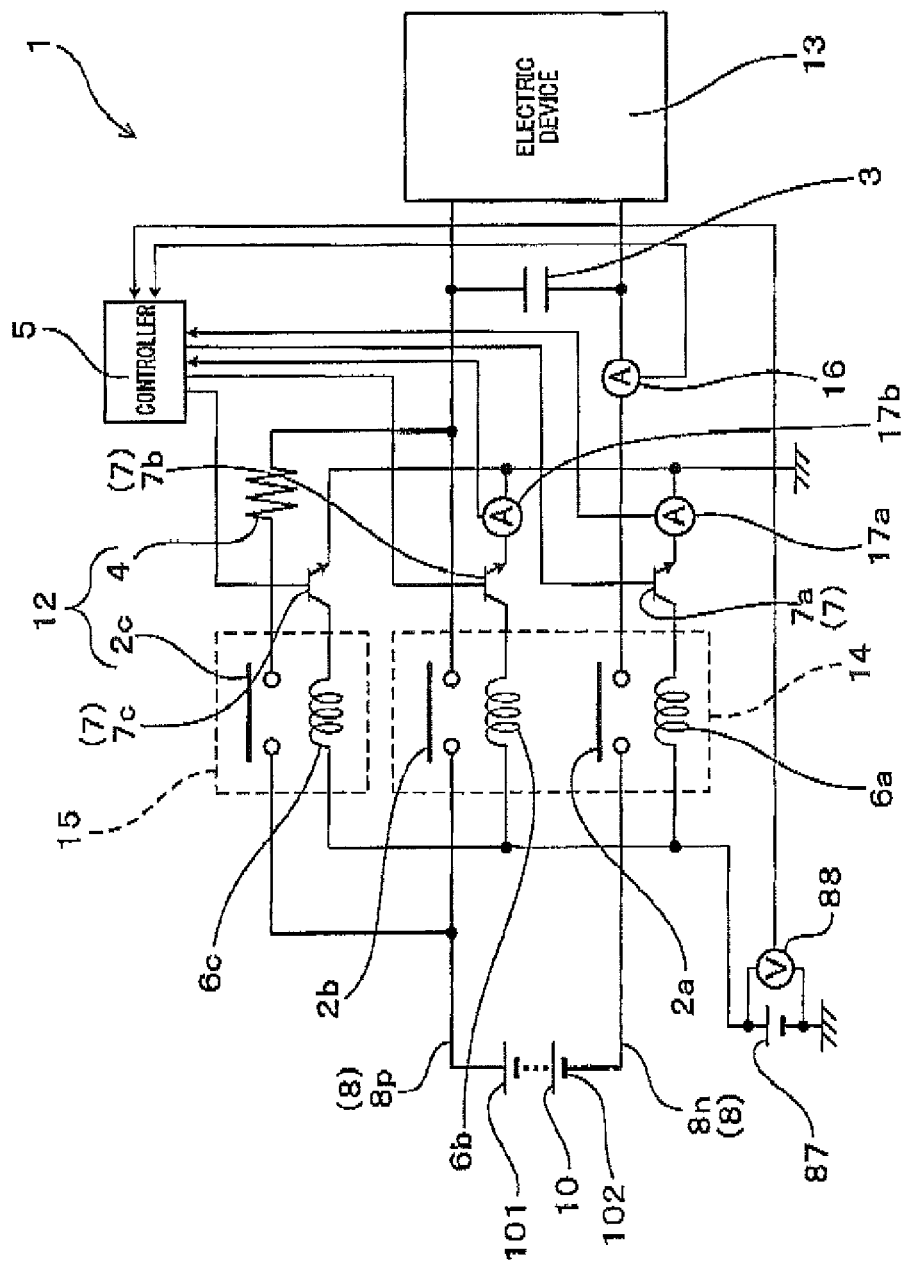
FIG. 11 is a circuit diagram which illustrates a relay system according to the third embodiment.

FIG. 10 is a flowchart of a sequence of logical steps or program to be executed by the control circuit 5.

After entering the program, the routine proceeds to step S11 wherein the transistor 7b is turned on. The routine then proceeds to step S12 wherein it is determined whether the sub-coil 6b is malfunctioning or not. If a YES answer is obtained meaning that the transistor 7b is turned on, but the diagnostic current sensor 17b does not measure the value of current higher than or equal to the given value (see FIG. 1), the control circuit 5 determines that the sub-coil 6b is malfunctioning. Alternatively, if a NO answer is obtained meaning that the current value higher than or equal to the given value is detected by the diagnostic current sensor 17b, the control circuit 5 determines that the sub-coil 6b is operating properly.

If a YES answer is obtained in step S12 meaning that the sub-coil 6b has failed in operation thereof, the routine then proceeds to step S15 wherein an error signal is produced to stop performing subsequent operations of the control circuit 5. Alternatively, if a NO answer is obtained in step S12 meaning that the sub-coil 6b is not malfunctioning, the routine then proceeds to step S13 wherein the pre-charge mode is entered. The routine then proceeds to step S14 wherein the power-on mode is entered.

As apparent from the above discussion, the control circuit 5 of this embodiment is not designed to diagnose the operation of the main coil 6a. The relay module 14 is, as already described, designed to turn off both the main switches 2a and 2b in response to energization of only the sub-coil 6b. Therefore, if the main coil 6a is malfunctioning, the energization of only the sub-coil 6b in the pre-charge mode will cause both the main switches 2a and 2b to be turned off, so that no inrush current flows through the capacitor 3. This eliminates the need for diagnosis of the main coil 6a and achieves the switching from the power-off mode to the pre-charge mode in a decreased period of time.

Other arrangements, operations, and beneficial advantages are identical with those in the first embodiment.

The relay system 1, as described above, turns off both main switches 2a and 2b when only the sub-coil 6b is energized, but may alternatively be designed to turn on only one of the main switches 2a and 2b when only the sub-coil 6b is energized. This also eliminates the need for diagnosing the operation of the main coil 6a. Thus, if the main coil 6a is malfunctioning, the energization of only the sub-coil 6b in the pre-charge mode will cause only one of the main switches 2a and 2b to be turned on, so that no inrush current flows through the capacitor 3. This eliminates the need for diagnosis of the main coil 6a and achieves the switching from the power-off mode to the pre-charge mode in a decreased period of time.

Third Embodiment

The relay system 1 of the third embodiment will be described below which is different from that in the first embodiment in structure thereof and the operation of the control circuit 5. The same reference numbers as employed in the first embodiment refer to the same parts unless otherwise specified, and explanation thereof in detail will be omitted here.

The relay system 1 of this embodiment is equipped with a coil power supply 87 connected to the coils 6 (6a to 6c). The coil power supply 87 has a voltage sensor 88 installed therein. The voltage sensor 88 connects with the control circuit 5. The relay module 14 is designed to turn on both the main switches 2a and 2b when voltage whose level is higher than a given threshold level Vs is applied to only one of the coils 6a and 6b, i.e., the sub-coil 6b.

Figure 12:
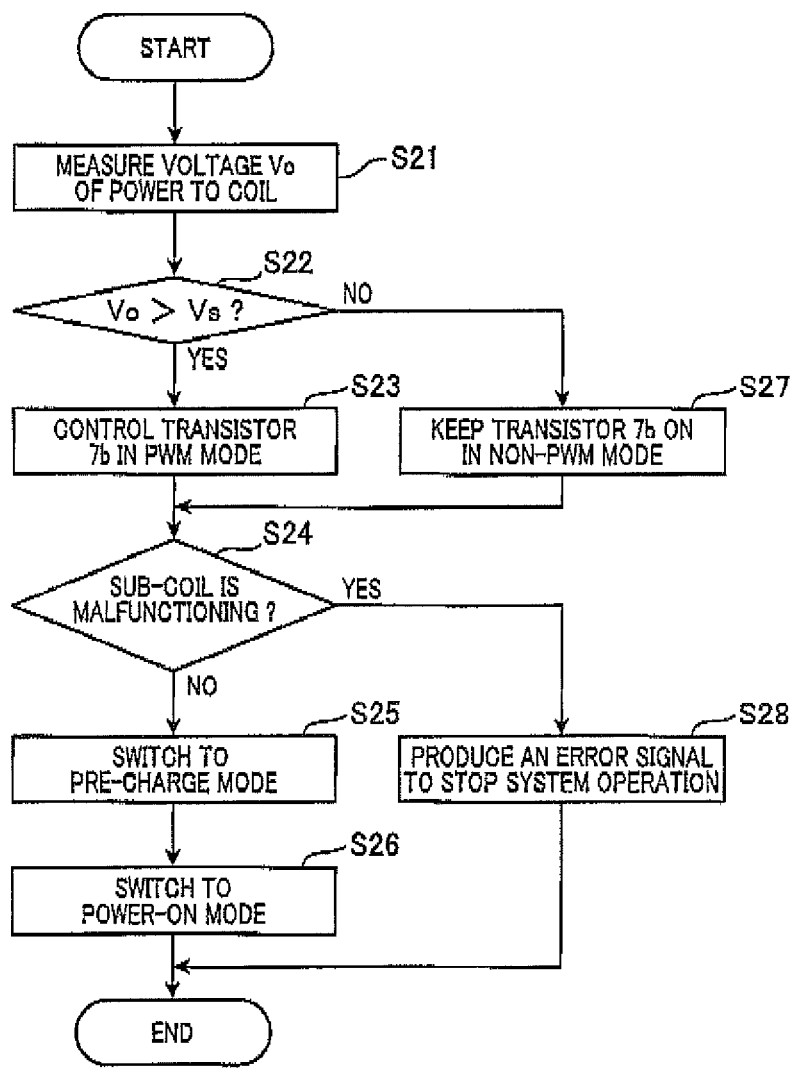
FIG. 12 is a flowchart of a program to be executed by a relay system in the third embodiment.

FIG. 12 is a flowchart of a sequence of logical steps or program to be executed by the control circuit 5.

Figure 13:
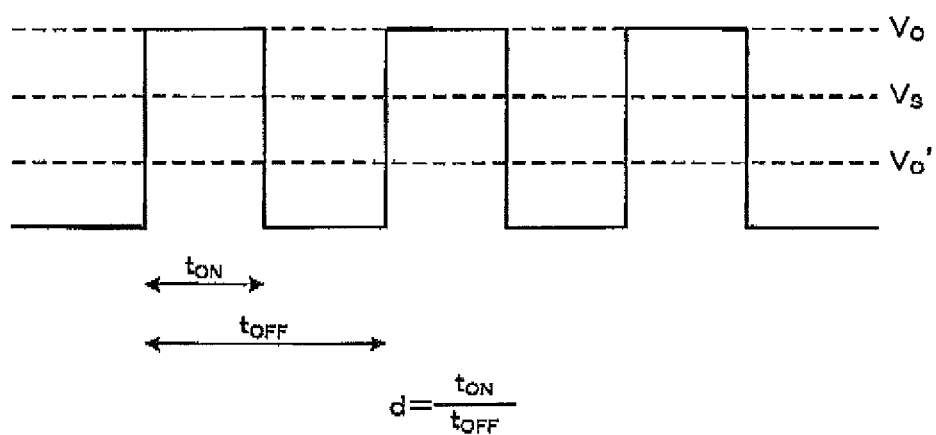
FIG. 13 is a view which shows a waveform of voltage applied to a sub-coil installed in a relay system of the third embodiment.

After entering the program, the routine proceeds to step S21 wherein the control circuit 5 measures voltage Vo at the coil power supply 87 using the voltage sensor 88. The routine then proceeds to step S22 wherein it is determined whether the voltage Vo at the coil power supply 87 is higher than the threshold level Vs or not. If a YES answer is obtained meaning that the voltage Vo is higher than the threshold level Vs, then the routine proceeds to step S23 wherein the transistor 7b is controlled in a PWM (Pulse-Width Modulation) control mode so as to meet a relation (1), as shown below, among the voltage Vo at the coil power supply 87, a duty cycle d of a drive signal for the transistor 7b, and the threshold level Vs. This causes an average Vo' of voltage applied to the sub-coil 7b, as illustrated in FIG. 13, to be lower than the threshold level Vs.

$$Vo \times d - Vo' < Vs \qquad (1)$$

If a NO answer is obtained in step 22 meaning that the voltage Vo is lower than or equal to the threshold level Vs, then the routine proceeds to step S27 wherein the transistor 7b is turned on, not placed in the PWM control mode. Specifically, the duty cycle of the drive signal for the transistor 7b is set to one. The voltage Vo at the coil power supply 87 is applied to the sub-coil 6b without being modulated.

After step S23 or S27, the routine proceeds to step S24 wherein it is determined whether the sub-coil 6b is malfunctioning or not. Specifically, if a NO answer is obtained meaning that the diagnostic current sensor 17b measures the value of current higher than or equal to the given threshold value upon turning on of the transistor 7b in step S23 or S27, the control circuit 5 determines that the sub-coil 6b is operating properly. Alternatively, if a YES answer is obtained meaning that the current value higher than or equal to the given value is not detected by the diagnostic current sensor 17b, the control circuit 5 determines that the sub-coil 6b is malfunctioning.

If a YES answer is obtained in step S24 meaning that the sub-coil 6b has failed in operation thereof, the routine then proceeds to step S28 wherein an error signal is produced to stop performing subsequent operations of the control circuit 5. Alternatively, if a NO answer is obtained in step S24 meaning that the sub-coil 6b is not malfunctioning, the routine then proceeds to step S25 wherein the pre-charge mode is entered. The routine then proceeds to step S26 wherein the power-on mode is entered.

The operations and beneficial advantages in this embodiment will be described below. The relay system 1 of this embodiment is designed to control the operation of the transistor 7b in the PWM mode so as to bring the average voltage Vo' applied to the sub-coil 6b to be lower than the threshold level Vs at step S23. This prevents the main switches 2a and 2b from being turned on simultaneously and also enables the control circuit 5 to diagnose the operation of the sub-coil 7b, thus avoiding the flow of inrush current through the capacitor 3 which arises from turning on of the main switches 2a and 2b at the same time when the sub-coil 7b is diagnosed.

Other arrangements, operations, and beneficial advantages are identical with those in the first embodiment.

Fourth Embodiment

Figure 14:
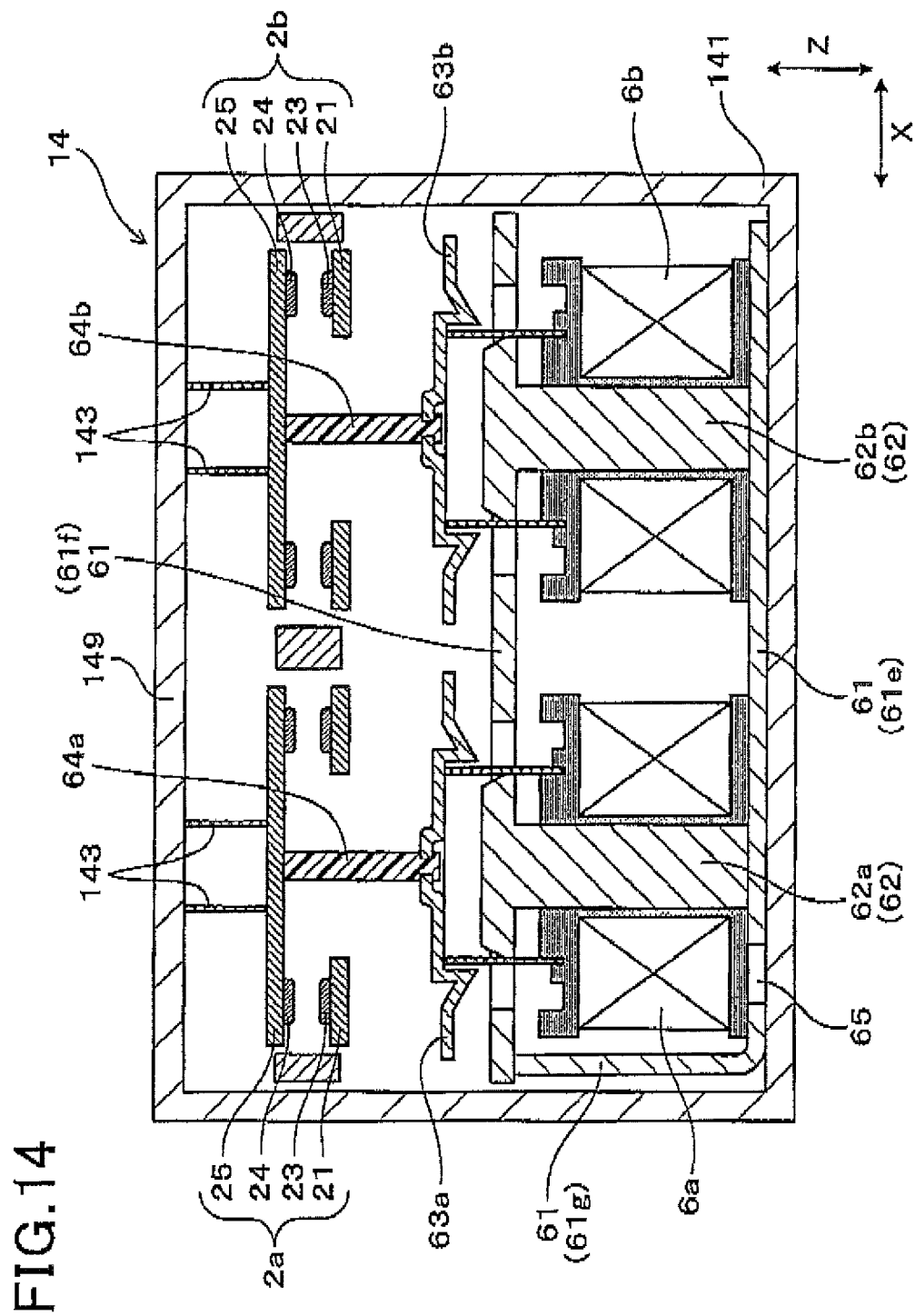
FIG. 14 is a vertical sectional view which illustrates a relay module in which two main switches are turned off in a fourth embodiment.

The relay system 1 of the fourth embodiment will be described below which is different from that in the first embodiment in structure of the relay module 14. Specifically, the relay module 14 is, as illustrated in FIG. 14, designed to have the fixed core 63 made up of two discrete parts: the first fixed core 62a and the second fixed core 62b. The first and second fixed cores 62a and 62b are disposed in parallel to each other. The first fixed core 62a is installed inside the main coil 6a. The second fixed core 62b is disposed inside the sub-coil 6b. The relay module 14 has disposed therein a yoke 61 which is made of a soft magnetic material. The yoke 61 includes a bottom yoke 61e, a top yoke 61f, and a side yoke 61g. The bottom yoke 61e and the top yoke 61f extend parallel to each other. The side yoke 61g connects the bottom yoke 61e and the top yoke 61f together.

The relay module 14 is, like in the first embodiment, equipped with main switches 2a and 2b. Each of the main switches 2a and 2b includes the fixed contact support 21, the moving contact support 25, the fixed contact 23, and the moving contact 24. The fixed contact 23 is retained by the fixed contact support 21. The moving contact 24 is retained by the moving contact support 25.

Figure 16:
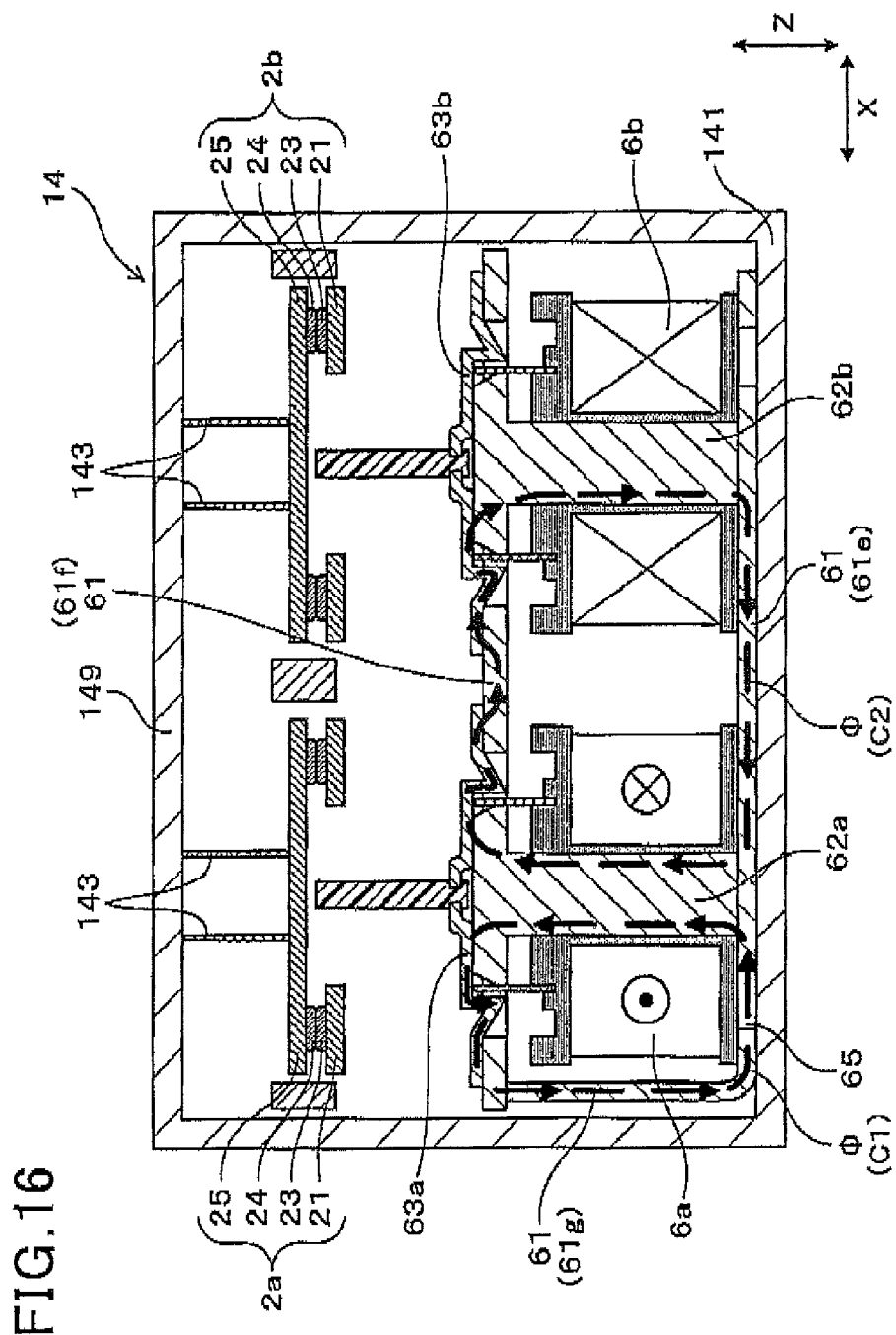
FIG. 16 is a vertical sectional view which illustrates a relay module in which two main switches are turned on in a fourth embodiment.

When only the main coil 6a is energized, as illustrated in FIG. 16, it will cause the magnetic flux Φ, as produced by the main coil 6a, to create two flux flows: one traveling through the first magnetic circuit C1, and the other traveling through the second magnetic circuit C2. The first magnetic circuit C1 is made up of the first fixed core 62a, the first plunger 63a, and the yokes 61 (61e, 61f, and 61g). The second magnetic circuit C2 is made up of the first fixed core 62a, the second fixed core 62b, the bottom yoke 61e, and the top yoke 61f.

The first magnetic circuit C1 has formed therein the magnetic saturator 65 which restricts the magnetic flux Φ, as produced by the main coil 6a, so that the magnetic flux Φ flows through the second magnetic circuit C2 as well as the first magnetic circuit C1. The resultant magnetic force attracts the first plunger 63a to the first fixed core 62a and also attracts the second plunger 63b to the second fixed core 62b, thereby turning on the main switches 2a and 2b simultaneously.

Figure 15:
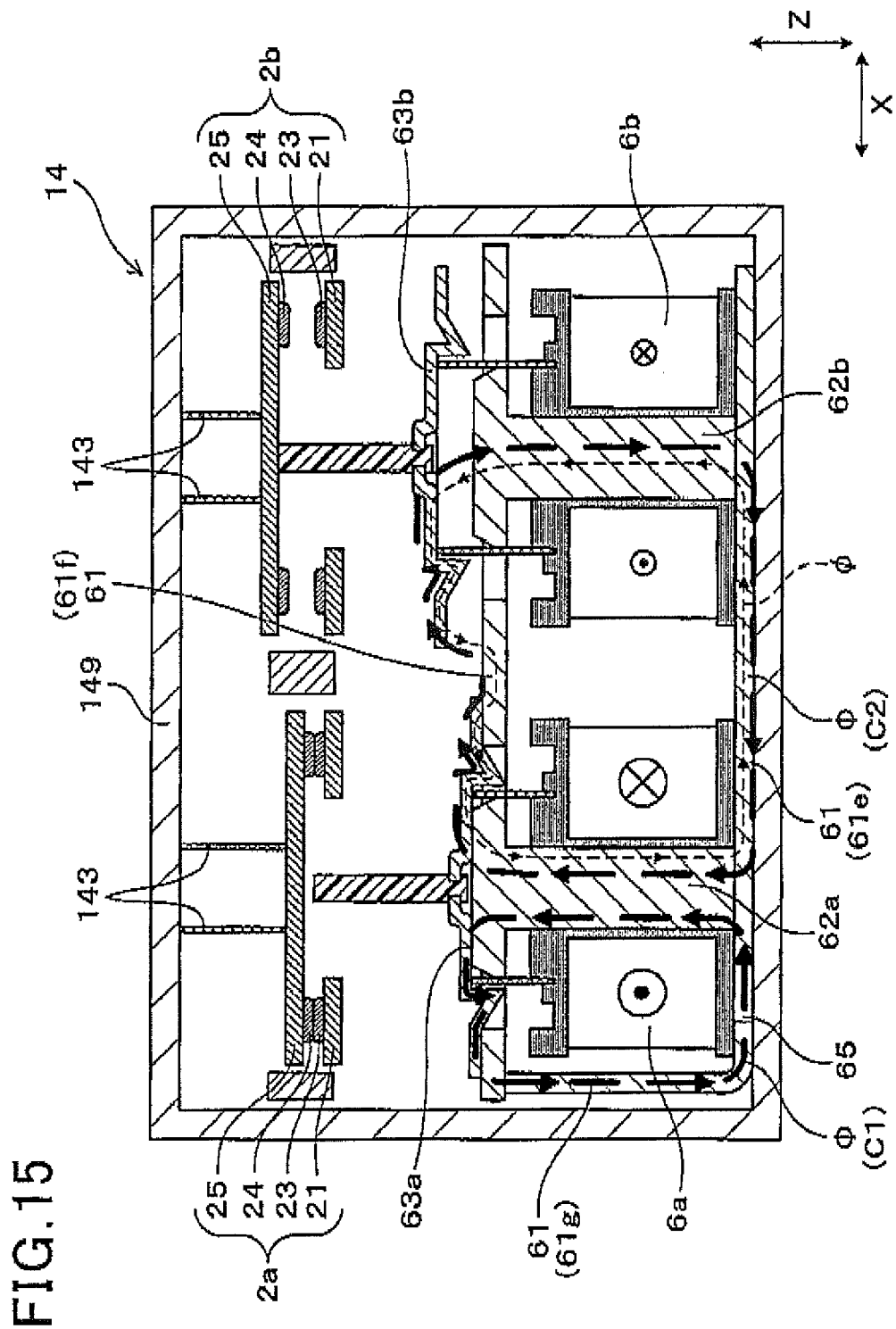
FIG. 15 is a vertical sectional view which illustrates a relay module in which only one of main switches is turned off in a fourth embodiment.

When both the main coil 6a and the sub-coil 6b are, as illustrated in FIG. 15, energized, it will cause the magnetic flux Φ, as produced by the main coil 6a, to create two flows: one traveling through the first magnetic circuit CJ, and the other traveling through the second magnetic circuit C2, and magnetic flux Φ, as produced by the sub-coil 6b, to create one flow which travels through the second magnetic circuit C2. The flow of the magnetic fluxes Φ produced by the main coil 6a which flows in the second magnetic circuit C2 and the flow of the magnetic flux Φ produced by the sub-coil 6b which flows in the second magnetic circuit C2 are oriented in opposite directions. The magnetic flux Φ produced by the main coil 6a and the magnetic flux Φ produced by the sub-coil 6b are, therefore, apparently cancelled by each other in the second magnetic circuit C2, thus resulting in a decreased magnetic force to move the second plunger 63b toward the second fixed core 62b, so that the second plunger 63b is not attracted fully to the sub-coil 6b, thereby placing the main switch 2b in the off-state.

Other arrangements, operations, and beneficial advantages are identical with those in the first embodiment.

Fifth Embodiment

Figure 17:
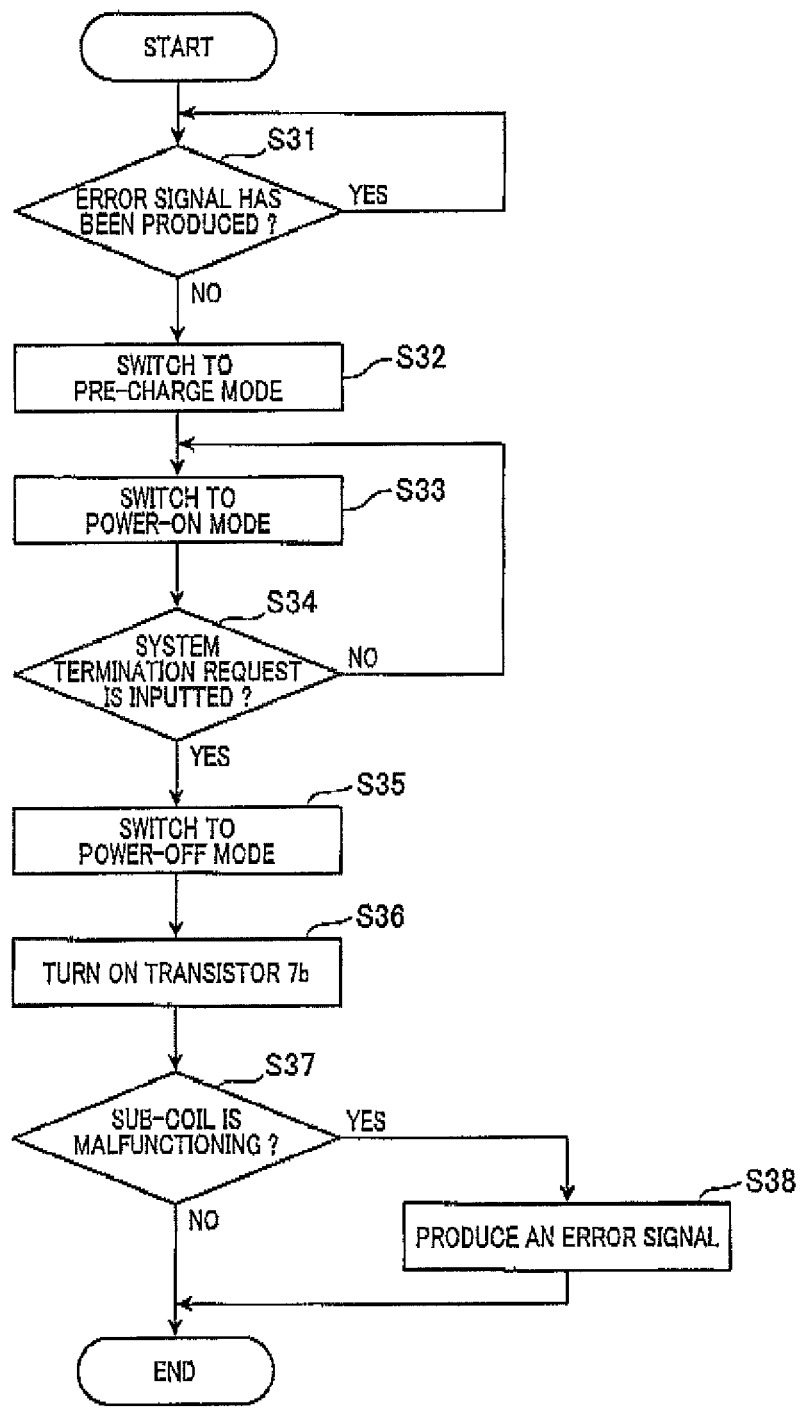
FIG. 17 is a flowchart of a program to be executed by a relay system according to the fifth embodiment.

The relay system 1 of this embodiment is different from that in the first embodiment in time when the sub-coil 6b is diagnosed. Specifically, the control circuit 15 of this embodiment, as illustrated in FIG. 17, starts diagnosing the sub-coil 6b at the end of the operation of the relay system 1, that is, upon switching from the power-on mode to the power-off mode.

After entering the program of FIG. 17, the routine proceeds to step S31 wherein it is determined whether an error signal, as will be described later in detail, has been produced or not. If a YES answer is obtained meaning that the error signal is produced, then the routine repeats step S31, that is, inhibits the pre-charge mode from being entered. Alternatively, if a NO answer is obtained meaning that the error signal is not produced, then the routine proceeds to step S32 wherein the pre-charge mode is entered.

After the operation of the pre-charge mode is completed in step S32, the routine proceeds to step S33 wherein the power-on mode is entered. The routine then proceeds to step S34 wherein it is determined whether a system termination request signal has been inputted or not. If a NO answer is obtained, then the routine repeats the operation in step S34, in other words, the control circuit 5 maintains the power-on mode until the system termination request signal is inputted. If a YES answer is obtained in step S34, then the routine proceeds to step S35 wherein the power-off mode is entered. Subsequently, the routine proceeds to step S36 wherein the transistor 7b, as illustrated in FIG. 1, is turned on. The routine proceeds to step S37 wherein it is determined whether the sub-coil 6b is malfunctioning or not. Specifically, if a YES answer is obtained meaning that the current value higher than or equal to the given value is not detected by the diagnostic current sensor 17b, the control circuit 5 determines that the sub-coil 6b is malfunctioning. Alternatively, if a NO answer is obtained meaning that the diagnostic current sensor 17b measures the value of current higher than or equal to the given threshold value, the control circuit 5 determines that the sub-coil 6b is operating properly.

If a NO answer is obtained in step S37 meaning that the sub-coil 6b is operating properly, then the routine terminates. Alternatively, if a YES answer is obtained meaning that the sub-coil 6b has failed in operation thereof, the routine then proceeds to step S38 wherein the error signal is produced. The routine then terminates.

When the error signal is produced in step S38, it will cause an affirmative answer to be obtained in step 331 in a subsequent cycle of execution of the program of FIG. 17, thus inhibiting the control circuit 5 from entering the pre-charge mode in step S32. This avoids switching to the pre-charge mode when the sub-coil 6b is not operating properly, thereby eliminating the risk that only the main coil 6a is energized in the pre-charge mode so that both the main switches 2a and 2b are turned on when the capacitor 3 is not charged completely. This avoids flow of inrush current through the capacitor 3.

Other arrangements, operations, and beneficial advantages are Identical with those in the first embodiment.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A relay system comprising:
    a pair of power lines which connect between a dc power supply and an electrical device;
    main switches disposed in said power lines, respectively;
    a capacitor connected between said power lines;
    a series-connected assembly which includes a current-limiting resistor and a pre-charge switch joined in series with the current-limiting resistor, the series-connected assembly being connected in parallel to one of the main switches; and
    a control circuit which works to control on-off operations of the main switches and the pre-charge switch,
    wherein the main switches are disposed in a relay module along with a main coil and a sub-coil, the relay module being designed to turn on both the main switches when only the main coil is energized and also to turn on only one of the main switches to which the series-connected assembly is not joined in parallel when both the main and sub-coils are energized,
    wherein the control circuit switches among a power-off mode, a pre-charge mode, and a power-on mode, in the power-off mode, the main switches being both turned off, in the pre-charge mode, the pre-charge switch being turned on, and the main and sub-coils being energized to turn off one of the main switches to which the series-connected assembly is joined in parallel and turn on the other main switch to which the series-connected assembly is not joined, in the power-on mode which is entered following the pre-charge mode, only the main coil being energized to turn on both the main switches, and
    wherein when the relay system starts or terminates, the control circuit works to diagnose an operation of the sub-coil, and when it is determined that the sub-coil is malfunctioning, the control circuit inhibiting the pre-charge mode from being entered.

2. A relay system as set forth in claim 1, wherein the relay module is engineered to turn off both the main switches when only the sub-coil is energized.

3. A relay system as set forth in claim 1, wherein the relay module works to turn on only one of the main switches when only the sub-coil is energized.

4. A relay system as set forth in claim 1, further comprising a coil power supply joined to the sub-coil, a voltage sensor which measures a voltage at the coil power supply, and a transistor connected in series with the sub-coil, wherein the control circuit determine whether the voltage at the coil power supply is higher than a given threshold level or not to diagnose whether the sub-coil is malfunction or not, and when it is determined that the voltage is higher than the given threshold level, the control circuit serving to control an operation of the transistor in a PWM mode so as to meet a relation of $Vo \times d < Vs$ where Vo is the voltage at the coil power supply, d is a duty cycle of a drive signal for the transistor, and Vs is the given threshold level.

* * * * *